US012585311B2

(12) United States Patent
Hilliard

(10) Patent No.: US 12,585,311 B2
(45) Date of Patent: Mar. 24, 2026

(54) COMPUTING DEVICE

(71) Applicant: LENOVO (SINGAPORE) PTE. LTD.,
Singapore (SG)

(72) Inventor: Matthew Sean Hilliard, Morrisville,
NC (US)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 147 days.

(21) Appl. No.: 18/395,686

(22) Filed: Dec. 25, 2023

(65) Prior Publication Data

US 2025/0208666 A1      Jun. 26, 2025

(51) Int. Cl.
*G06F 1/16* (2006.01)
(52) U.S. Cl.
CPC .......... *G06F 1/1681* (2013.01); *G06F 1/1616*
(2013.01)
(58) Field of Classification Search
CPC .............................. G06F 1/1616; G06F 1/1681
See application file for complete search history.

(56) References Cited

U.S. PATENT DOCUMENTS 5,842,508 A * 12/1998 Krupke ................... E05D 15/24
16/261
6,831,229 B1 * 12/2004 Maatta .................. H04M 1/022
174/67

11,379,005 B2 * 7/2022 Xue ..................... H04M 1/0268
2007/0289097 A1 * 12/2007 Barnett ................. G06F 1/1616
16/342
2016/0041589 A1 * 2/2016 Tazbaz .................. H04M 1/022
361/679.06
2020/0142454 A1 * 5/2020 Alva ..................... G06F 1/1647
2022/0159110 A1 * 5/2022 Lim ....................... H04M 1/022
2025/0208648 A1 * 6/2025 Hilliard ................. G06F 1/1681
2025/0208665 A1 * 6/2025 Hilliard ................. G06F 1/1616

FOREIGN PATENT DOCUMENTS

EP          3 817 344 A1     5/2021

OTHER PUBLICATIONS

EP Appl. No. 24213675.2-1218, Extended European Search Report,
Mar. 13, 2025 (10 pages).

* cited by examiner

*Primary Examiner* — Anthony Q Edwards
(74) *Attorney, Agent, or Firm* — Brian J. Pangrle

(57) ABSTRACT

A device can include a first housing that includes a pivot and
a hinge recess that includes a stop surface; a second housing
that includes a pivot and a hinge recess; a hinge link that
includes a first portion coupled to the pivot of the first
housing, a second portion coupled to the pivot of the second
housing, and a concave portion disposed between the first
portion and the second portion, where the concave portion
includes a stop; and a bearing coupled to the pivot of the first
housing, where, upon transitioning the second housing with
respect to the first housing between a closed position and a
fully open position, at a predefined open position, the stop
contacts the stop surface and the bearing locks the hinge link
in a locked link position.

19 Claims, 10 Drawing Sheets

COMPUTING DEVICE

TECHNICAL FIELD

Subject matter disclosed herein generally relates to technology for computing devices.

BACKGROUND

A computing device can include a display housing assembly and a keyboard housing assembly that are coupled via one or more hinge assemblies. For example, a laptop computing device (e.g., a laptop computer) can be a clamshell device with such housing assemblies.

SUMMARY

A device can include a first housing that includes a pivot and a hinge recess that includes a stop surface; a second housing that includes a pivot and a hinge recess; a hinge link that includes a first portion coupled to the pivot of the first housing, a second portion coupled to the pivot of the second housing, and a concave portion disposed between the first portion and the second portion, where the concave portion includes a stop; and a bearing coupled to the pivot of the first housing, where, upon transitioning the second housing with respect to the first housing between a closed position and a fully open position, at a predefined open position, the stop contacts the stop surface and the bearing locks the hinge link in a locked link position. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
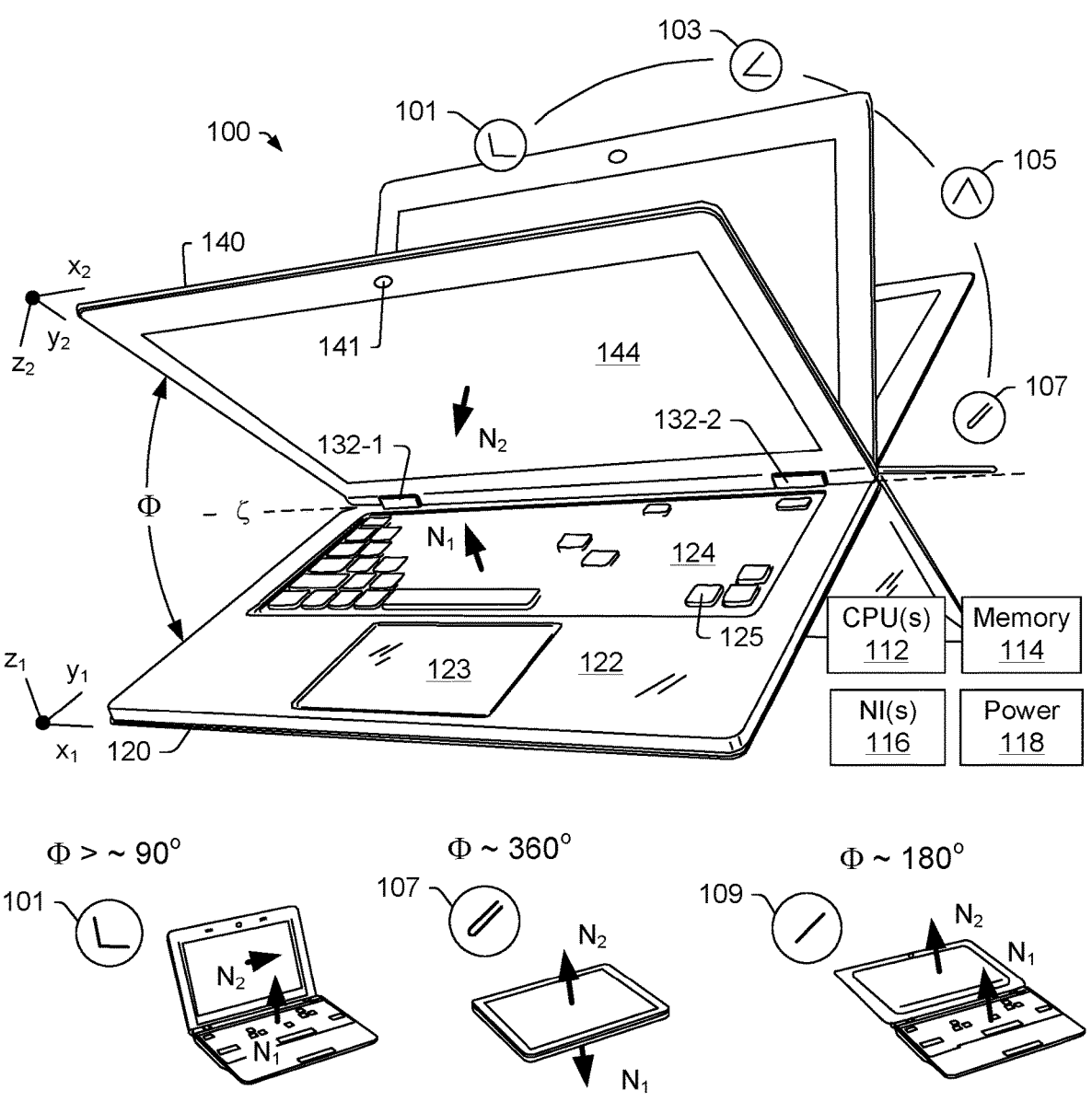
FIG. 1 is a diagram of an example of a computing device.

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system; noting that some clamshell computing systems may be limited in open angle orientations. For example, a clamshell computing system may be able to be opened to the orientation 109 (e.g., substantially 180 degrees) without being able to be opened to the orientation 107 (e.g., substantially 360 degrees).

As shown in FIG. 1, the orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an unde-pressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the user's hand or hands. A user may perceive the springiness of the keys 125 as being somewhat undesirable. For example, springy keys may interfere with a user's ability to compre-hend or sense force that is sufficient to grasp the computing device 100, which may cause the user to grasp too lightly or to grasp too strongly, which may possibly impact integrity of the keys (e.g., springs, spring-mechanisms, contacts, etc.). In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
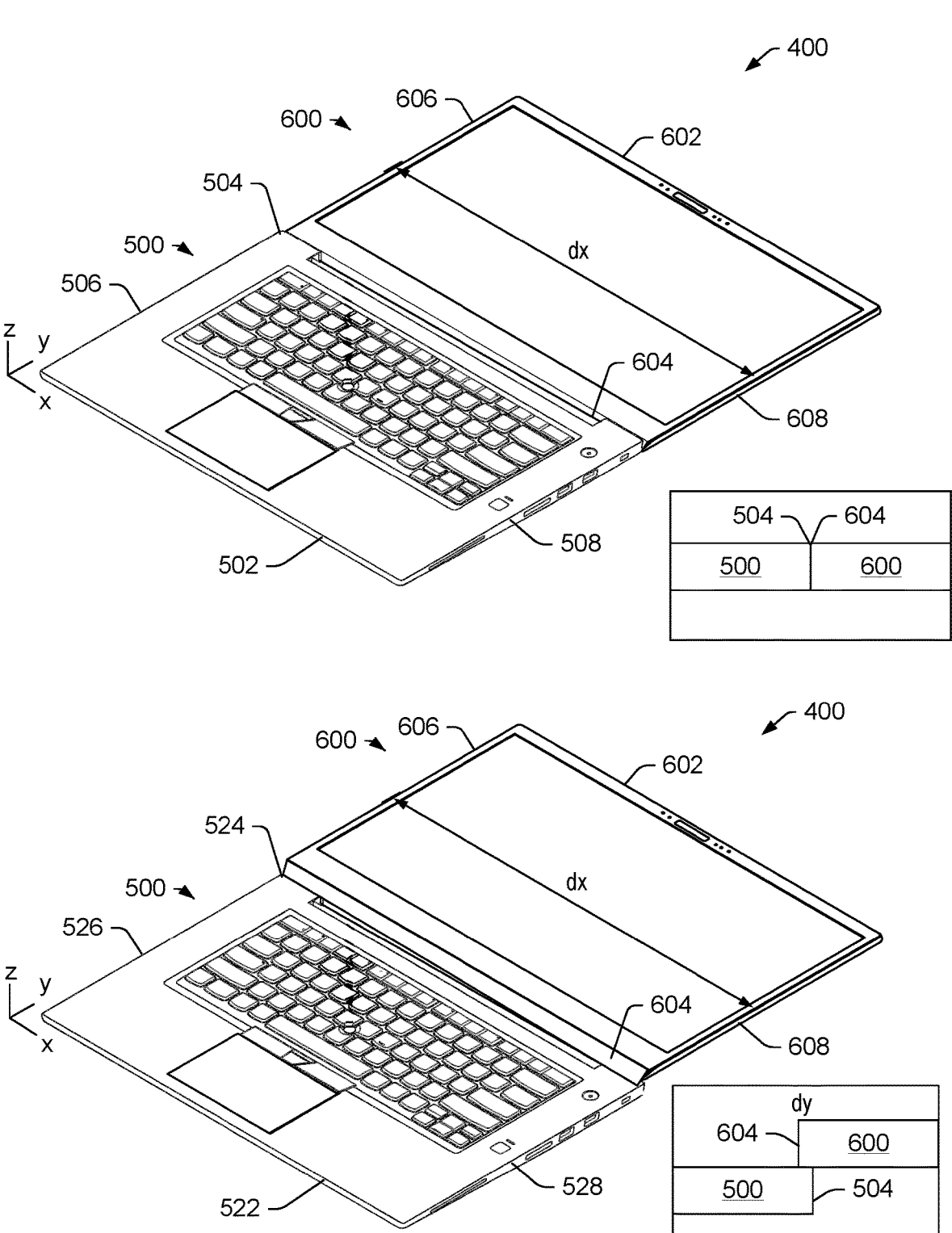
FIG. 2 is a series of diagrams of an example of a computing device or computing system.

FIG. 2 shows an example of a computing device 400 that includes a base housing 500 and a display housing 600 that can be coupled together via one or more hinge assemblies. As shown, the base housing 500 can include a front edge 502, a back edge 504 and opposing side edges 506 and 508 and the display housing 400 can include a front edge 602, a back edge 604 and opposing side edges 606 and 608. In the example of FIG. 2, the back edges 504 and 604 can be hinge side edges where one or more hinge assemblies couple the housings 500 and 600 together.

As shown, the computing device 400 may include one or more hinge assemblies that can provide for a substantially planar arrangement of the housing 500 and 600 when opened to approximately 180 degrees or, for example, the computing device 400 may include one or more hinge assemblies that can provide for a stepped arrangement of the housings 500 and 600 when opened to approximately 180 degrees. In the non-stepped arrangement, if the back edge 504 includes any features, these may become inaccessible once the computing device 400 is opened to approximately 180 degrees; whereas, in the stepped arrangement, if the back edge 504 includes any features, these may still be accessible once the computing device 400 is opened to approximately 180 degrees.

As to some examples of back edge features, these may include one or more vents, one or more connectors, one or more memory card slots, etc. Thus, in some instances, a stepped arrangement may provide some benefits over a non-stepped arrangement.

As shown in FIG. 2, the housings 500 and 600 may have a housing width dx, which may be approximately the same (e.g., plus or minus less than 5 mm). As to the stepped arrangement, a step dimension dy may be greater than approximately 1 mm (e.g., plus or minus 0.5 mm) and less than approximately 10 mm (e.g., plus or minus 2 mm). As an example, in a stepped arrangement, the housings 500 and 600 may contact each other over at least a portion of a step dimension (e.g., a step distance). As an example, one or more step surfaces may provide for contact that helps to limit further opening of the computing device 400 beyond approximately 180 degrees. As an example, one or more hinge assemblies may include one or more features that provide for limiting opening of the computing device 400 to beyond approximately 180 degrees.

Figure 3:
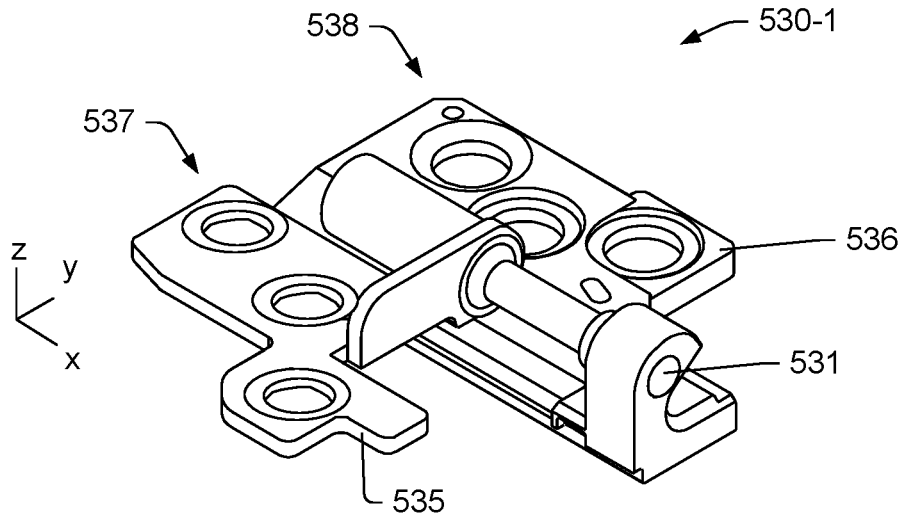
FIG. 3 is a series of diagrams of example of hinge assemblies.
Figure 3:
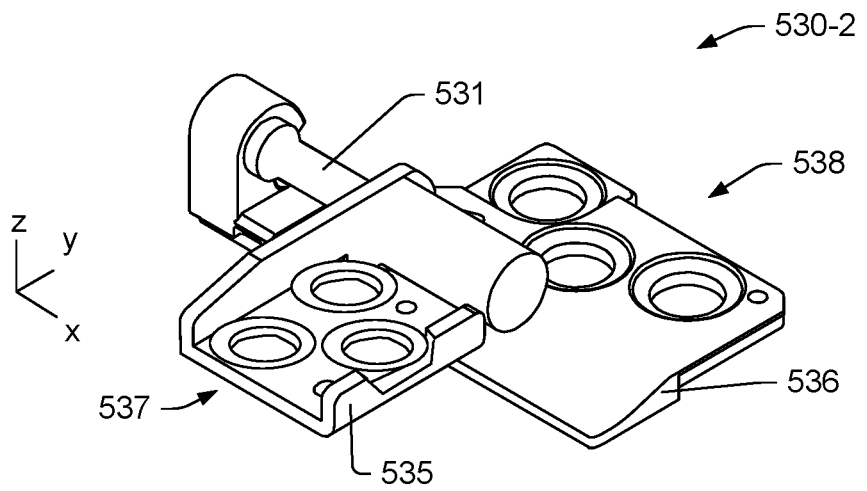

FIG. 3 shows perspective views of example hinge assem-blies 530-1 and 530-2. As shown, each of the hinge assem-blies 530-1 and 530-2 can include an axle 531 that defines a rotational axis for a base housing leaf 535 and a display housing leaf 536 where each of the leaves 535 and 536 can include respective openings 537 and 538 for receipt of one or more fasteners to thereby couple the leaves 535 and 536 to a respective housing. As an example, one or more fasteners may be cooperatively coupled to a respective housing using one or more hinge mount features.

Figure 4:
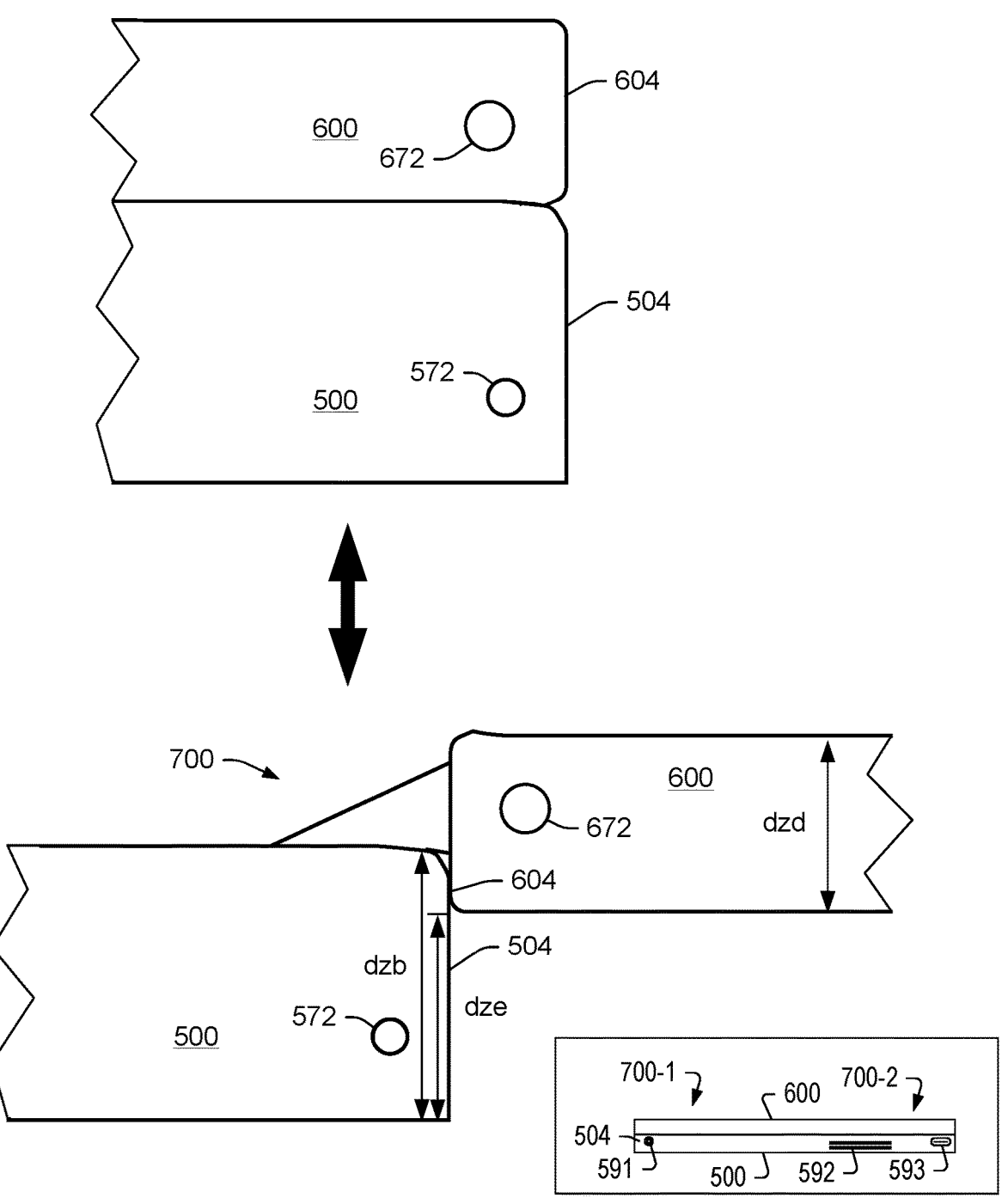
FIG. 4 is a series of diagrams of an example of a computing device.

FIG. 4 shows an example of a portion of a computing device that includes a base housing 500 and a display housing 600 along with a hinge assembly 700 that couples the housings 500 and 600 together. As shown, the hinge assembly 700 provides for a closed position where the edges 504 and 604 may be stacked and aligned and provides for an open position where the edges 504 and 604 may be offset to define a step, as in a stepped arrangement. For example, the display housing 600 may not be fully disposed behind the back edge 504 of the base housing 500 such that the back edges 504 and 604 partially overlap. In comparison to the stepped arrangement of FIG. 2, the stepped arrangement of FIG. 4 may involve an overlap of the back edge 504 of the base housing 500 and the back edge 604 of the display housing 600. For example, in FIG. 2, the overlap is with respect to a top surface of the base housing 500 and a back surface of the display housing 600, which forms a step that is forward of the back edge 504 of the base housing 500; whereas, in the example of FIG. 4, the step is formed substantially even with the back edge 504 of the base housing 500, however, a portion of the back edge 504 remains accessible in the example of FIG. 4 when the housings 500 and 600 are in the fully open position.

As shown in the example of FIG. 4, the base housing 500 may have a thickness or height dzb at or near the back edge 504 and the display housing 600 may have a thickness or height dzd at or near the back edge 604. As shown, in the open position, a portion of the back edge 504 may be exposed, for example, along a height dze. As shown in the example of FIG. 4, the back edge 504, along an exposed portion, may include one or more features, such as, for example, one or more ports 591 and 593 and/or one or more vents 592. As an example, a device may include one or more instances of the hinge assembly 700, for example, consider the one or more hinge assemblies 700-1 and 700-2.

As shown in the example of FIG. 4, the display housing 600 can include a pivot 672 and the base housing 500 can include a pivot 572. As an example, the hinge assembly 700 may include a hinge link and a bearing where the hinge link is operatively coupled to the pivots 572 and 672 and the bearing is operatively coupled to the pivot 572. In such an example, the bearing may provide for locking of the hinge link to prevent unintended rotation of the hinge link in a particular direction.

As an example, a bearing may be a uni-directional bearing, which may be, for example, a one-way type of clutch bearing (e.g., a one-way roller clutch or a clutch bearing). As an example, a bearing may be a type of bearing designed to transmit torque in one direction while allowing relatively free rotation in the opposite direction. As an example, a bearing may provide unidirectional motion and/or backstop functionality. As an example, a one-way clutch bearing may to allow rotation in one direction while preventing or offering resistance to rotation in the opposite direction. As an example, a bearing may include a roller design or a sprag design. For example, a roller clutch may use cylindrical rollers that transmit torque in one direction, while a sprag clutch use sprags (e.g., small, wedge-shaped components) to achieve such a function. As an example, a bearing may include one or more features that may provide for rotation in one direction with a relatively low level of resistance and that may hinder rotation in an opposite direction by providing a higher level of resistance.

As an example, a device can include a first housing that includes a pivot and a hinge recess that includes a stop surface; a second housing that includes a pivot and a hinge recess; a hinge link that includes a first portion coupled to the pivot of the first housing, a second portion coupled to the pivot of the second housing, and a concave portion disposed between the first portion and the second portion, where the concave portion includes a stop; and a bearing coupled to the pivot of the first housing, where, upon transitioning the second housing with respect to the first housing between a closed position and a fully open position, at a predefined open position, the stop contacts the stop surface and the bearing locks the hinge link in a locked link position. As an example, the device may be a computing device where the first housing is a base housing (e.g., a keyboard housing, etc.) and where the second housing is a display housing.

Figure 5:
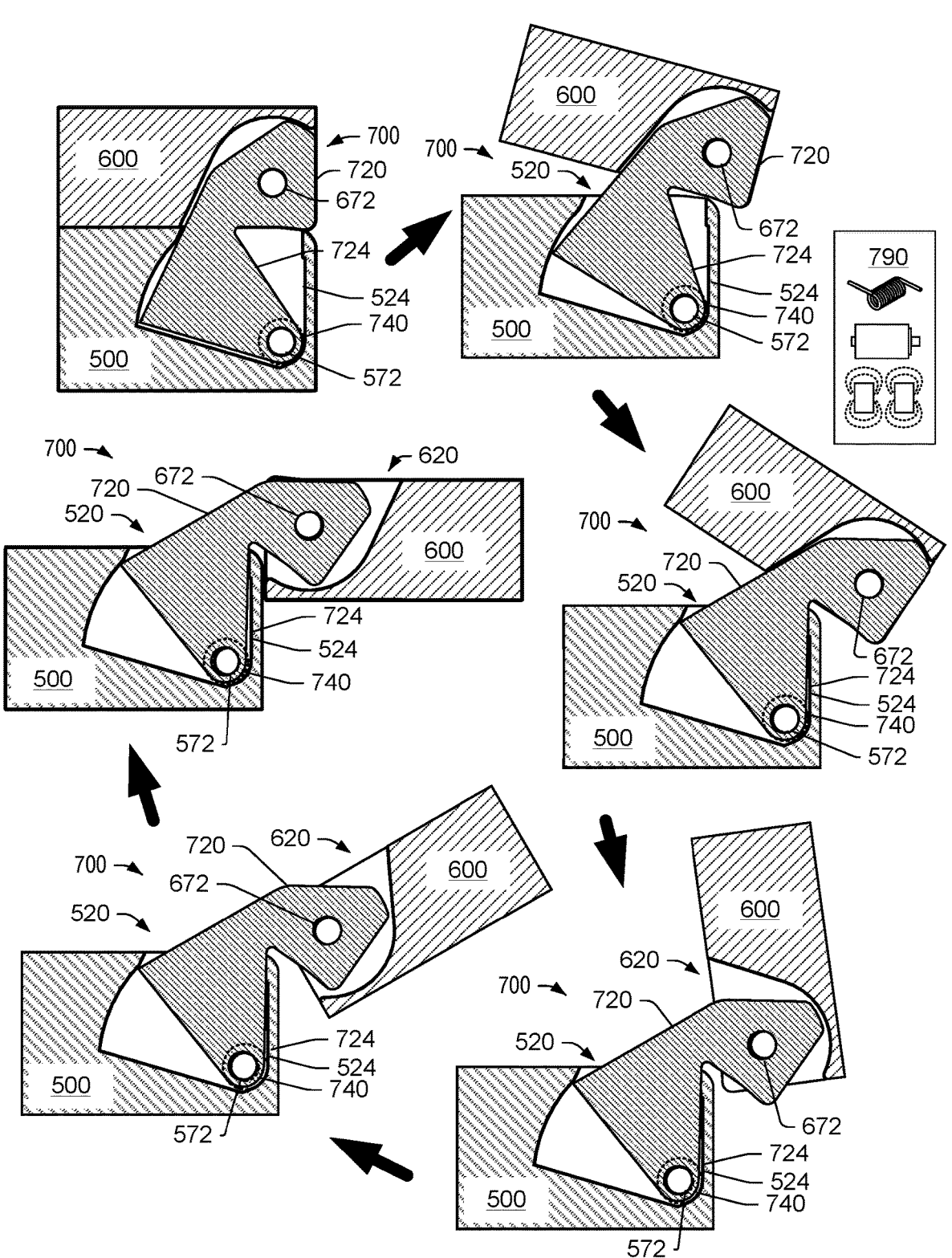
FIG. 5 is a series of diagrams of an example of a computing device.

FIG. 5 shows an example of the hinge assembly 700 with respect to the base housing 500 and the display housing 600 as transitioning from a closed position, to a first open position to a second open position to a third open position to a fourth open position and to a fifth open position, which may be an approximately 180 degree open position.

In the example of FIG. 5, the base housing 500 include a hinge recess 520 and the display housing 600 includes a hinge recess 620. As explained, the base housing 500 can include the pivot 572 and the display housing 600 can include the pivot 672. In the example of FIG. 5, a bearing 740 is shown as being associated with the pivot 572.

As an example, the hinge link 720 may be free to rotate into a fully rotate position as shown as being in a clockwise direction in the example of FIG. 5. As to degree of rotation, consider rotation of approximately 30 degrees before a stop 724 of the hinge link 720 contacts a stop surface 524 of the recess 520 of the base housing 500; noting that a maximum rotation may be an angle within a range of angles such as, for example, a range from approximately 10 degrees to approximately 60 degrees (e.g., as may be achieved by configuration of the stop 724 and the stop surface 524, etc.). As an example, the hinge link 720 may be rotatable with a first level of friction (e.g., frictional force to be overcome for rotation), which may be achieved, for example, where the bearing 740 is provides for relatively low friction spinning in the clockwise direction (e.g., consider a one-way-bearing, etc.). In such an example, the pivot 672 may provide a second, higher level of friction such that the display housing 600 does not rotate with respect to the pivot 672 until after the hinge link 720 is stopped and, for example, hindered from being rotated in a counter-clockwise direction. In such an example, a user and/or a machine (e.g., an electric motor, etc.) may exert a first level of force to rotate the hinge link 720 about the pivot 572 and then exert a second level of force to rotate the display housing 600 about the pivot 672 such that the housings 500 and 600 open in a multi-stage manner (e.g., a two-stage manner). As explained, a substantially higher friction of the pivot 672 can help to prevent rotation of the display housing 600 about the pivot 672 until the hinge link 720 is fully rotated about the pivot 572. As explained, a one-way-bearing may be utilized to hinder the hinge link 720 from rotating back into its closed position. Where the hinge link 720 may rotate by a maximum of approximately 30 degrees about the pivot 572, the display housing 600 may rotate by a remaining number of degrees about the pivot 672 to reach the fully open position of approximately 180 degrees. For example, consider the display housing 600 rotating by approximate 150 degrees where the pivot 672 may be a friction pivot that exerts a sufficient amount of friction to hold the display housing 600 in a desired position (e.g., to reduce risk of movement under the influence of mass and gravity). As to closing of the device, the display housing 600 may be rotated counter-clockwise in the example of FIG. 5 followed by counter-clockwise rotation of the hinge link 720. In such an example, rotation of the hinge link 720 in the counter-clockwise direction may be achieved though application of a force that is greater than the force required to rotate the hinge link 720 in the clockwise direction. As explained, the bearing 740 may be a one-way-bearing that may include rolling elements set in an outer race where the rolling elements provide for clockwise rotation and where they may be blocked from counter-clockwise rotation such that, for example, the outer race must be rotated in a counter-clockwise direction to return the hinge link 720 to its closed position. In such an example, the outer race of the bearing may be interference fit into a bore of the base housing 500 where the interference fit allows for rotation of the outer race therein upon application of force that is greater than a force required to rotate a shaft or axle that is rotatable via the rolling elements of the bearing. As to the 30 degree maximum rotation example, consider rotating the display housing 600 by 150 degrees where additional force is applied to rotate the outer race of a one-way bearing in its friction mount by another 30 degrees.

As to transitioning the display housing 600 with respect to the base housing 500, consider starting in a closed position followed by a first stage of movement of the hinge link 720 via the lower pivot 572 rotating on one-way-bearing held in place with friction until the first stage reaches a maximum extension of approximately 30 degrees. Next, a second stage may commence as the display housing 600 begins to rotate via the pivot 672 where the one-way-bearing hinders backwards movement of the hinge link 720 via the lower pivot 572. In such an example, the display housing 600 may continue to be rotated to desired position, for example, up to approximately 180 degrees. As shown, a portion of the back edge 604 of the display housing 600 may sit against a portion of the back edge 504 of the base housing 500. As explained, transitioning from an open position to a closed position can involve application of an amount of force to the hinge link 720 that causes overcoming of frictional force of the bearing 740 such that the hinge link 720 can be returned to its original closed position.

As explained, the bearing 740 can act in coordination with the hinge link 720 to help to avoid rotation of the display housing 600 about the pivot 672 for a range of angles, that may correspond to an angle of the closed position until contact occurs between the stop 724 of the hinge link 720 and the stop surface 524 of the base housing 500. As explained, two different types of movement of the display housing 600 with respect to the base housing 500 can occur where, a first type of movement can be achieved via the hinge link 720 until the stop 724 contacts the stop surface 524, at which point, a second type of movement can be achieved via the display housing 600 pivoting via the pivot 672 until the back edge 604 of the display housing 600 contacts the back edge 504 of the base housing 500. As explained, the bearing 740 can help to prevent "falling down" of the hinge link 720 once the hinge link 720 is stopped by contact between the stop 724 and the stop surface 524. Such an approach, which may be referred to as a locking approach, can be a safety measure and/or a "feel" measure to help assure that opening of the display housing 600 with respect to the base housing 500 occurs in a desirable manner.

FIG. 5 also shows various examples of biasing components 790, which may include one or more springs, one or more electric motors, one or more magnets and/or ferro-magnetic materials, etc. As an example, a spring may be a torsion type of spring that may be positioned with respect to a pivot to bias a component or components, for example, to assist with movement of the hinge assembly 700 toward a position (e.g., closed position, open position, etc.) and/or to help maintain a component or components at a position. As an example, an electric motor may be actuatable responsive to a signal to cause movement of a component or components of the hinge assembly 700 toward a position (e.g., closed position, open position, etc.) and/or to help maintain a component or components at a position. As an example, one or more magnets (e.g., permanent, electro-permanent, electric, etc.) may be utilized to cause movement of a component or components toward a position (e.g., closed position, open position, etc.) and/or to help maintain a component or components at a position. As an example, a housing or housings may include one or more magnets and/or ferromagnetic materials that may operate as a latch to maintain housings in a closed position, where, for example, upon release of the latch, a hinge assembly or hinge assemblies may be forcibly biased to cause one housing to transition to an open position with respect to another housing.

Figure 6:
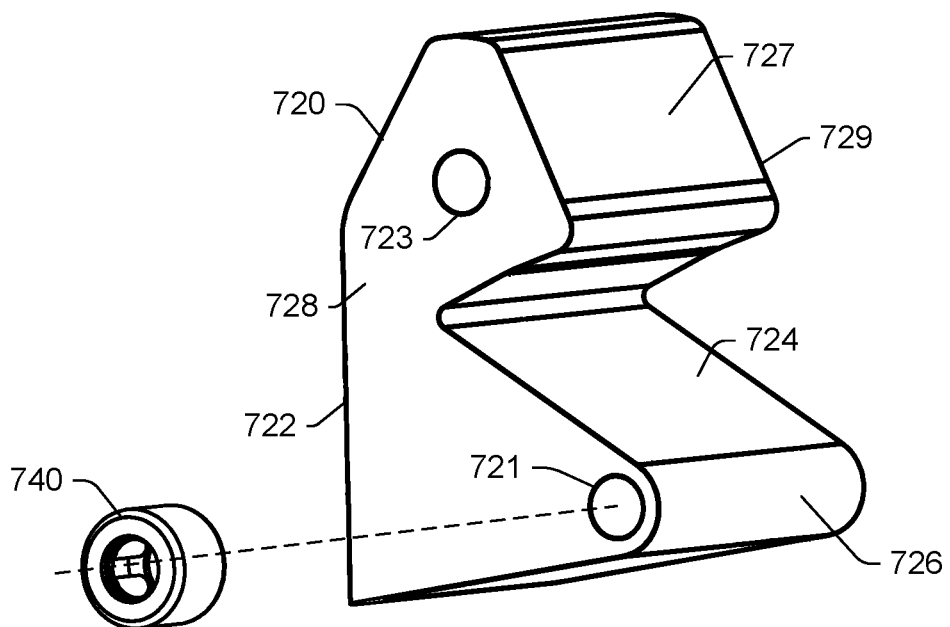
FIG. 6 is a series of diagrams of examples of components of an example of a hinge assembly.
Figure 6:
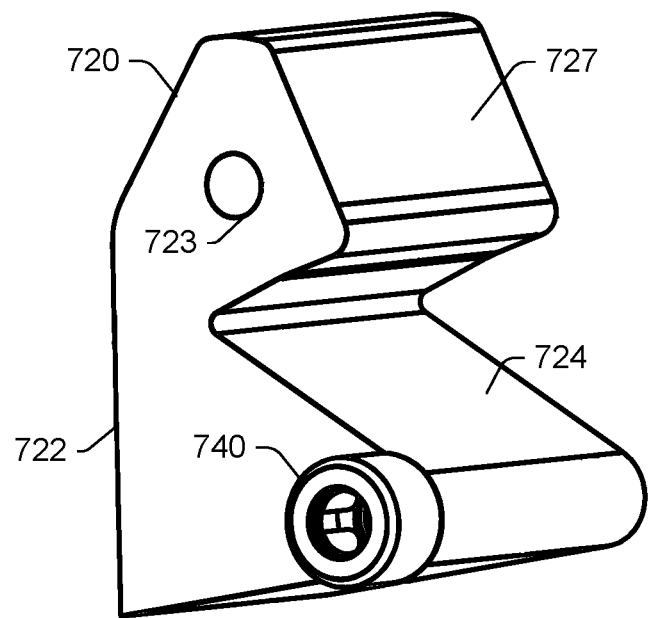

FIG. 6 shows a series of views of the hinge link 720 and the bearing 740. As shown, the hinge link 720 can two portions 726 and 727 where the portion 726 may be referred to as a base portion and where the portion 727 may be referred to as a head portion. As shown, the portion 726 can include a bore 721 for an axle (e.g., a shaft) and the portion 727 can include a bore 723 for another axle (e.g., a shaft). As shown, the bearing 740 may be positioned with respect to the bore 721, for example, to receive an axle where, for example, the bearing 740 is set within a bore of the base housing 500.

In the example of FIG. 6, the hinge link 720 is shown as including the stop 724 along with a back side 722 that extends between opposing sides 728 and 729 of the hinge link 720 where the bores 721 and 723 may extend between the opposing sides 728 and 729 as through bores; noting that one or more partial bores may be utilized, for example, with one or more corresponding partial axles, etc. As shown, the hinge link 720 may have a concavity between the portion 726 and 727 where the stop 724 is a surface within the concavity. For example, in a side view, the profile of the hinge link 720 may be concave as may be tested by drawing a line between a point in the portion 726 and a point in the portion 727 where the line crosses the stop 724 to be outside of the boundaries of the hinge link 720. As an example, the hinge link 720 may be substantially triangular shaped with a V-shaped cutout portion where, for example, the stop 724 is within the V-shaped cutout portion.

Figure 7:
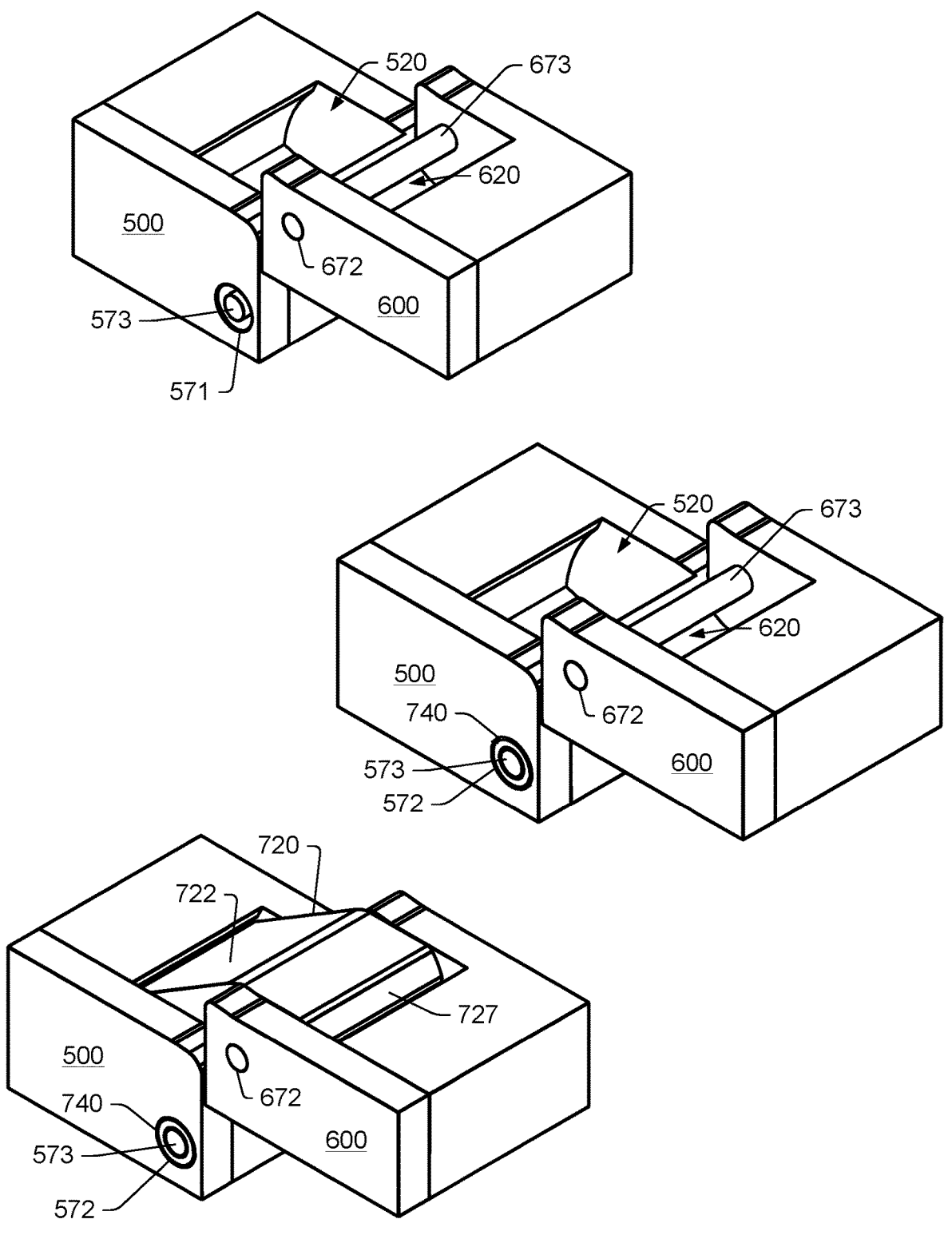
FIG. 7 is a series of diagrams of an example of a hinge assembly.

FIG. 7 shows a series of perspective views of an example of the base housing 500 and the display housing 600 without and with the hinge link 720 and the bearing 740. As shown, the base housing 500 can include the pivot 572, which may include an axle 573 (e.g., a shaft) where the axle 573 extends from one side of the recess 520 to an opposite side of the recess 520. As shown, the pivot 572 may be formed in part by the bearing 740, which may be set in a bore 571 (e.g., a partial bore of a through bore) in the base housing 500. As an example, the bearing 740 can include an outer race that may be rotated within the bore 571 when a force is applied that overcomes an amount of friction between an outer surface of the outer race and an inner surface of the bore 571.

As to the display housing 600, it can include the pivot 672, which may include an axle 673 that may extend from one side of the recess 620 to an opposite side of the recess 620.

As shown in the example of FIG. 7, the head portion 727 of the hinge link 720 may be disposed at least in part in the recess 620 of the display housing 600 while the base portion 726 of the hinge link 720 is disposed at least in part in the recess 520 of the base housing 500. As shown, the hinge link 720 may substantially cover the recess 520 when the housings 500 and 600 are in an open position such that, for example, risk of debris entering the recess 520 may be minimized.

Figure 8:
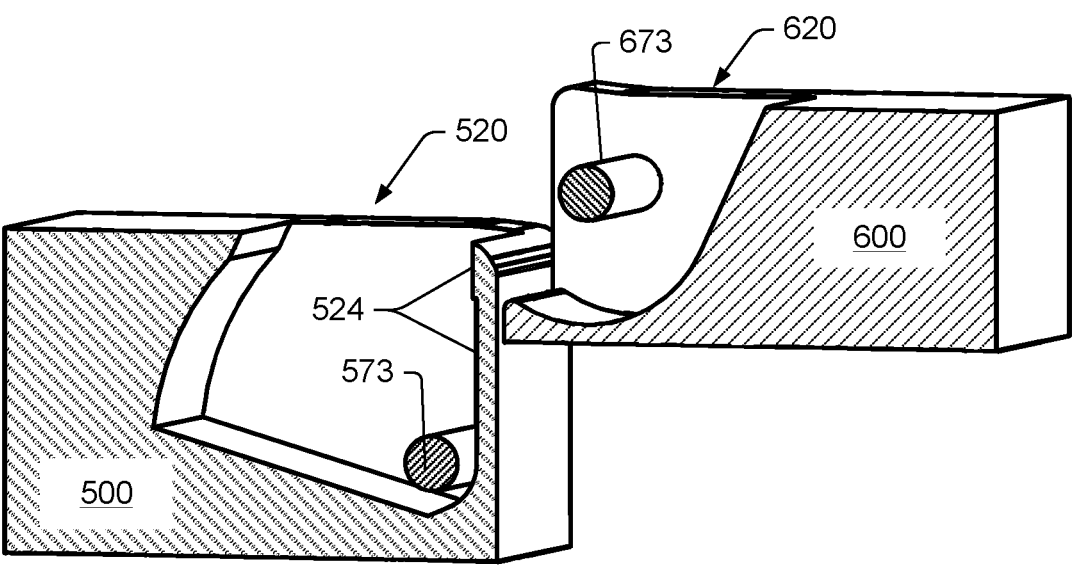
FIG. 8 is a series of diagrams of an example of a hinge assembly.
Figure 8:
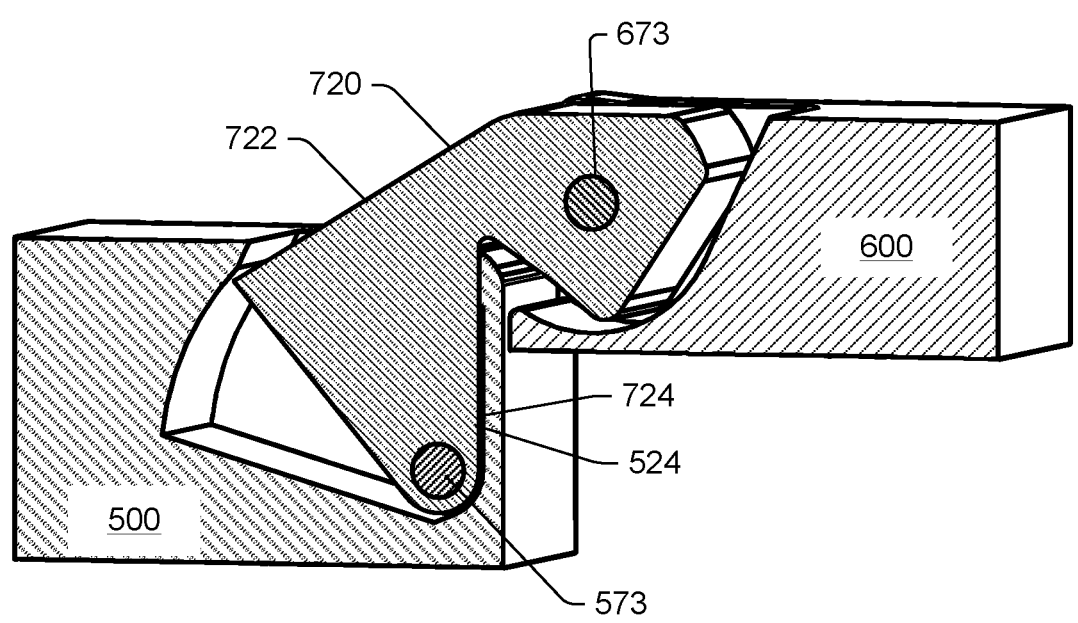

FIG. 8 shows cross-sectional perspective views of examples of the housings 500 and 600 in an open position with and without the hinge link 720. As shown, the recess 520 of the base housing 500 can include various features, such as, for example, the stop surface 524 and the axle 573, which may be a separate component that is fit into a bore to secure the hinge link 720. As shown, the recess 620 of the display housing 600 can include various features, such as, for example, the axle 673. As shown, in the open position, the back side 722 (e.g., a wall, etc.) can cover most of an opening to the recess 520 while also covering part of the recess 620.

In the example of FIG. 8, the hinge link 720 is in a maximum rotated position, which, as explained, can be defined by contact between the stop 724 and the stop surface 524 of the base housing 500 where, in the maximum rotated position, the display housing 600 may further rotate about the pivot 672 where the bearing 740 helps to prevent rotation of the hinge link 720 about the pivot 572.

Figure 9:
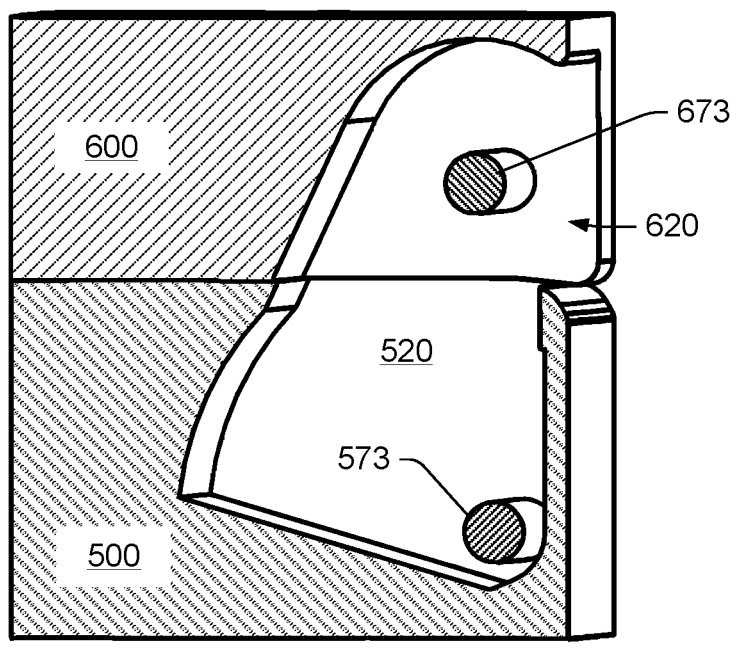
FIG. 9 is a series of diagrams of an example of a hinge assembly.
Figure 9:
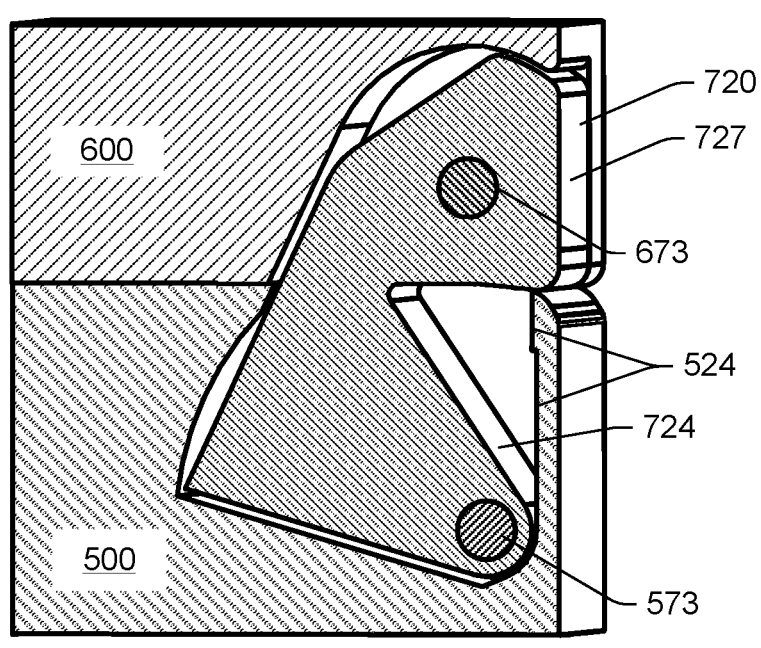

FIG. 9 shows cross-sectional perspective views of examples of the housings 500 and 600 in a closed position with and without the hinge link 720. As shown, the recess 520 of the base housing 500 can include various features, such as, for example, the stop surface 524 and the axle 573, which may be a separate component that is fit into a bore to secure the hinge link 720. As shown, the recess 620 of the display housing 600 can include various features, such as, for example, the axle 673. As shown, in the closed position, a side of the head portion 727 of the hinge link 720 may substantially cover the recess 620 of the display housing 600 where the display housing 600 covers the recess 520 of the base housing 500. In such an example, the recesses 520 and 620 may be substantially sealed or otherwise covered to reduce risk of debris entering one or more of the recesses 520 and 620. In such an example, the side of the head portion 727 of the hinge link 720 may be sized and/or shaped to match an exterior profile of the back edge 604 of the display housing 600 and/or the back edge 504 of the base housing 500. For example, the side of the head portion 727 of the hinge link 720 may be substantially flat.

As explained, the bearing 740 (e.g., allowing rotation in a direction with reduced friction) and friction about the pivot 672 can provide for rotation of the hinge link 720 and the display housing 600 effectively as a unit where rotation of the display housing 600 with respect to the pivot 672 can be limited (e.g., by friction). In such an approach, over a first range of open positions, the display housing 600 moves with respect to the base housing 500 via the hinge link 720 rotating about the pivot 572 until the stop 724 of the hinge link 720 contacts the stop surface 524 of the base housing 500. And, once such stopping occurs, the display housing 600 may rotate about the pivot 672, for example, to open to a fully open position (e.g., at an angle of approximately 180 degrees). As explained, for sake of safety and/or feel, the bearing 740 may effectively lock the hinge link 720 with respect to the pivot 572, which may help to assure that, once the stopping occurs, the hinge link 720 does not move (e.g., rotate).

As explained, the recess 520 of the base housing 500 can include the stop surface 524 that can be contacted by the stop 724 of the hinge link 720, for example, to prevent further rotation of the hinge link 720 about the pivot 572. In such an example, further rotation of the hinge link 720 can be prevented by contact of the stop surface 524 and the stop 724, where, for example, the display housing 600 may further rotate about the pivot 672. As an example, rotation may be explained using clockwise and counter-clockwise directions. As an example, opening may be in a clockwise direction where a locking mechanism engages during opening to lock a hinge link in a position such that rotation of the hinge link in a counter-clockwise direction does not occur, for example, until desired (e.g., closing in a counter-clockwise direction).

As to a transition from an open position to a closed position, various features may provide for simultaneous movement of the hinge link 720 with respect to the pivot 572 and of the display housing 600 with respect to the pivot 672. In a fully closed position, the hinge link 720 and the bearing 740 may be set (e.g., reset) to provide for guided open in a two-stage manner.

As an example, a computing device may be defined using terms A-cover, B-cover, C-cover and D-cover. For example, a display housing may include an A-cover as an outer or back side shell and a B-cover as a display side shell that may be or include a display bezel while a base housing (e.g., a keyboard housing) may include a D-cover as a bottom side shell and a C-cover as an opposing side shell, which may be a keyboard bezel. As an example, a hinge assembly may provide for desirable A-cover and C-cover features.

As an example, the hinge assembly 700 may be a two-stage locking 180 degree hinge assembly. As explained, a computing device may include one or more types of hinge assemblies. For example, consider a tower style hinge assembly and a drop style hinge assembly. Tower hinge assemblies tend to be rather simplest and provide full access to the rear of a base housing (e.g., keyboard housing) as to ports, vents, etc. However, tower hinge assemblies tend to require notches on an A-cover to provide for a 180 degree range of opening. While drop hinge assemblies may be implemented without such notches, for example, by moving a pivot further down the back side of a computing device, this can result in blocking off a back edge (e.g., rear edge) of the computing device in a manner that may not allow for ports, unobstructed vents for cooling, etc.

As an example, the hinge assembly 700 may be a type of multi-stage locking hinge assembly that provides for opening of housings to approximately 180 degrees. Such a hinge assembly may provide for partial automatic opening and/or closing depending on configuration, for example, with relatively smooth operation throughout one or more ranges.

As explained, a hinge assembly may provide for two-stage motion that moves a pivot point past a back edge of a housing (e.g., chassis, etc.) in order to allow a display housing to move 180 degrees without requiring an A-cover of the display housing to have notches. In a transition from closed to open, a first rotation stage may be controlled at least in part via a bearing.

As an example, a hinge assembly may include a dual pivot linkage (e.g., a hinge link) that is free to rotate into its own fully extended position (e.g., approximately 30 degrees rotation, etc.) with relatively light friction. As an example, this first stage of movement may be spring loaded in either direction depending on what "feel" as to action is desired. As an example, spring loading of a hinge link first stage may provide for a natural feel of opening, which may be augmented by a magnetic closure with possible auto-opening functionality. For example, consider release of a magnetic clasp as a closure whereby spring action takes over to complete at least a portion of a first stage of opening.

As an example, once a hinge link reaches its full extension in a first stage of opening, a display housing may be rotated in a second stage of opening, which may occur while the hinge link is locked. As an example, consider a hinge assembly where rotation of a display housing occurs in a second stage, for example, for an approximate range of rotation from approximately 30 degrees to approximately 180 degrees (e.g., over a span of approximately 150 degrees). In such an example, upon closing of the display housing, once it reaches approximately 30 degrees, the hinge link may be unlocked, for example, a lock may disengage allowing the housings to be closed.

As an example, a hinge assembly may provide for a closed position of housings, a first stage of movement that begins with a lower pivot until the first stage reaches a maximum extension of approximately 30 degrees (e.g., consider a maximum within a range from approximately 10 degrees too approximately 60 degrees) where, as a top housing begins to rotate on a second pivot, a locking mechanism engages preventing lower pivot from moving whereby the top housing can continue rotating to a desired position up to approximately 180 degrees. In such an example, at approximately 180 degrees, the top housing may sit slightly behind a bottom housing (e.g., some amount of back edge to back edge overlap). As to closing, a locking mechanism (e.g., a lock) may keep a hinge assembly synchronized by unlocking after a top housing is rotated back to a particular point.

As an example, a hinge assembly may include one or more springs, one or more interference fits, etc. In such an example, one or more of friction, torque, etc., may be managed via an arrangement of features.

As an example, a device can include a first housing that includes a pivot and a hinge recess that includes a stop surface; a second housing that includes a pivot and a hinge recess; a hinge link that includes a first portion coupled to the pivot of the first housing, a second portion coupled to the pivot of the second housing, and a concave portion disposed between the first portion and the second portion, where the concave portion includes a stop; and a bearing coupled to the pivot of the first housing, where, upon transitioning the second housing with respect to the first housing between a closed position and a fully open position, at a predefined open position, the stop contacts the stop surface and the bearing locks the hinge link in a locked link position. In such an example, in the locked link position, the second housing can be pivotable via the pivot of the second housing.

As an example, a closed position of housings of a device may correspond to an angle of approximately 0 degrees and a predefined open position of the housing of the device may corresponds to an angle of approximately 10 degrees to approximately 60 degrees. In such an example, the predefined open position may correspond to an angle of approximately 30 degrees.

As an example, between a closed position and a predefined open position of housings of a device, pivots of a hinge assembly of the device may operate with a level of friction less than or equal to a first level of friction, and, between the predefined open position and a fully open position of the housings of the device, the pivots may operate with a level of friction greater than the first level of friction.

As an example, between a closed position and a predefined open position of housings of a device, pivots of a hinge assembly of the device may operate with a level of torque less than or equal to a first level of torque, and, between the predefined open position and a fully open position of the housing of the device, the pivots may operate with a level of torque greater than the first level of torque.

As an example, a bearing may be a uni-directional bearing. For example, consider a uni-directional bearing that rotates only in an opening direction of a second housing with respect to a first housing of a device where, for example, a hinge link can be rotatable in a closing direction of the second housing with respect to the first housing via frictional movement about the pivot of the first housing. As an example, a bearing may include an outer race and bearings where an axle of a pivot is rotatable via the bearings in one rotational direction where, for example, the outer race may be set in a bore, for example, via an interference fit, where the outer race is rotatable in an opposite rotational direction as set in the bore. In such an example, rotation of the axle may be achieved in a first direction with a first level of force (e.g., due to rolling elements of a bearing, etc.) and in a second, opposite direction with a second level of force (e.g., due to an interference fit, etc.) where the second level of force is greater than the first level of force.

As an example, a fully open position of housings of a device may be an angle of approximately 180 degrees. In such an example, a closed position of the housings of the device may be an angle of approximately 0 degrees.

As an example, a first housing may be a base housing and a second housing may be a display housing that includes a display. In such an example, the base housing may include a processor and memory accessible to the processor where the processor is operatively coupled to the display. In such an example, a predefined open position may correspond to an open angle less than a viewing angle of the display of the display housing. In such an example, the viewing angle of the display may be an open angle greater than approximately 30 degrees. As an example, a viewing angle may generally be in a range of angles from approximately 80 degrees to approximately 180 degrees.

As an example, at an open position of a display housing with respect to a base housing that is greater than a predefined open position, friction force of pivots of a hinge assembly may exceed gravitational force to maintain the open position. In such an example, the gravitational force may correspond to a horizontal position of the base housing where the acceleration of gravity is normal to the base housing.

As an example, between a closed position and a fully open position of housings of a device, pivots of a hinge assembly of the device may operate individually over separate positional ranges. In such an example, the pivot of a first housing of the device may operate over a first positional range from the closed position to a predefined open position and the pivot of a second housing of the device may operate over a second positional range from the predefined open position to the fully open position.

As an example, a method may include, in a computing device that includes a base housing that includes a base housing pivot, a display housing that includes a display housing pivot, and a link coupled to the pivots, locking the link via a bearing in a locked position at a predefined open position of the display housing with respect to the base housing, where, in the locked position of the link, the display housing is pivotable with respect to the base housing via the display housing pivot.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
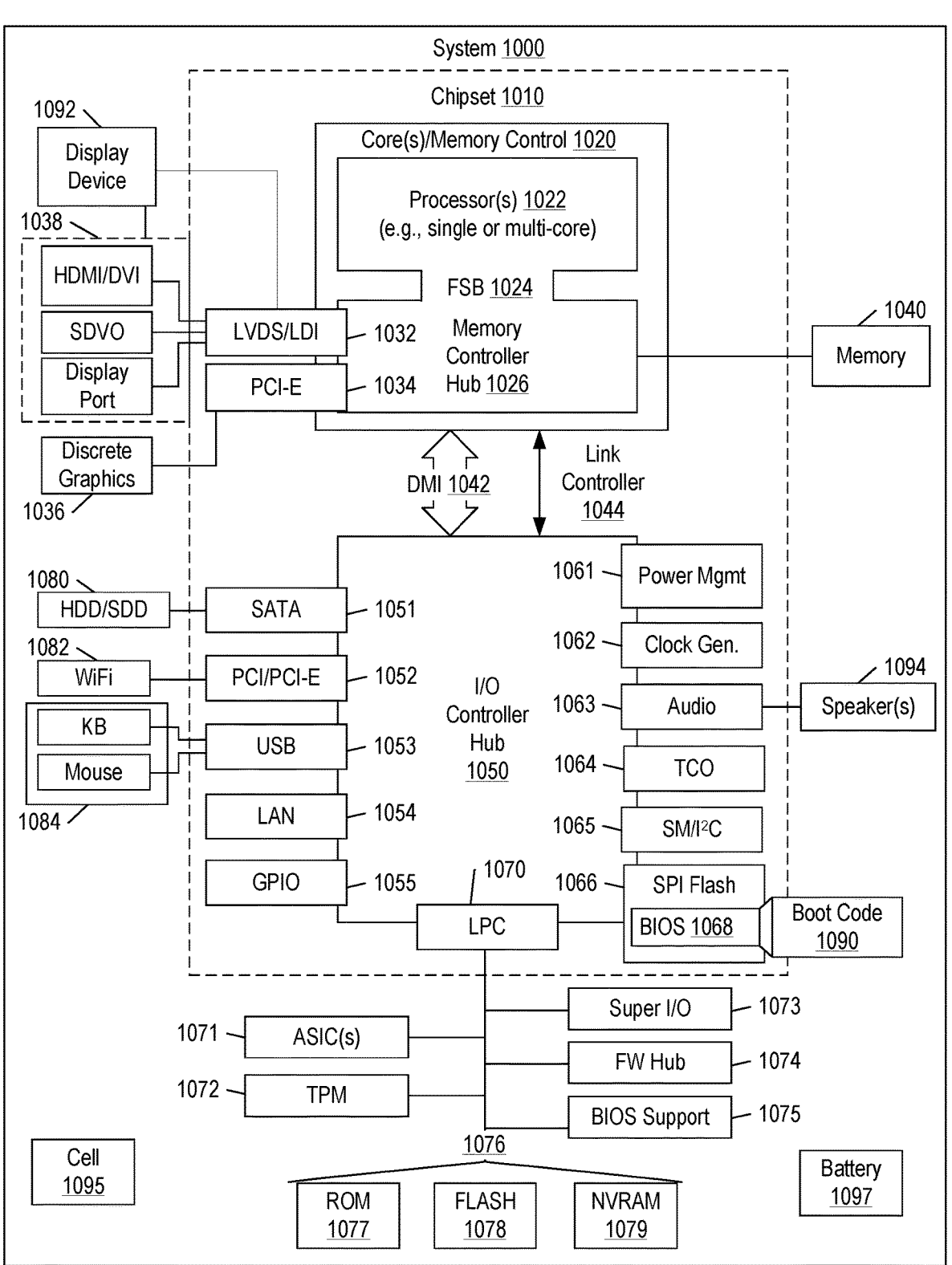
FIG. 10 is a diagram of an example of a system that includes one or more processors.

While various examples of circuits or circuitry have been discussed, FIG. 10 depicts a block diagram of an illustrative computer system 1000. The system 1000 may be a computer system, such as one of the THINKCENTER or THINKPAD series of personal computers sold by Lenovo (US) Inc. of Morrisville, NC, or a workstation computer system, such as the THINKSTATION, which are sold by Lenovo (US) Inc. of Morrisville, NC; however, as apparent from the description herein, a system or other machine may include other features or only some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I2C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I2C interface (see, e.g., the SM/I2C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a first housing that comprises a pivot and a hinge recess that comprises a stop surface;
a second housing that comprises a pivot and a hinge recess;
a hinge link that comprises a first portion coupled to the pivot of the first housing, a second portion coupled to the pivot of the second housing, and a concave portion disposed between the first portion and the second portion, wherein the concave portion comprises a stop; and
a bearing coupled to the pivot of the first housing, wherein the bearing comprises a uni-directional bearing that rotates only in an opening direction of the second housing with respect to the first housing, and wherein, upon transitioning the second housing with respect to the first housing between a closed position and a fully open position, at a predefined open position, the stop contacts the stop surface and the bearing locks the hinge link in a locked link position.

2. The device of claim 1, wherein, in the locked link position, the second housing is pivotable via the pivot of the second housing.

3. The device of claim 1, wherein the closed position corresponds to an angle of approximately 0 degrees, and wherein the predefined open position corresponds to an angle of approximately 10 degrees to approximately 60 degrees.

4. The device of claim 3, wherein the predefined open position corresponds to an angle of approximately 30 degrees.

5. The device of claim 1, wherein, between the closed position and the predefined open position, the pivots operate with a level of friction less than or equal to a first level of friction, and wherein, between the predefined open position and the fully open position, the pivots operate with a level of friction greater than the first level of friction.

6. The device of claim 1, wherein, between the closed position and the predefined open position, the pivots operate with a level of torque less than or equal to a first level of torque, and wherein, between the predefined open position and the fully open position, the pivots operate with a level of torque greater than the first level of torque.

7. The device of claim 1, wherein the hinge link is rotatable in a closing direction of the second housing with respect to the first housing via frictional movement about the pivot of the first housing.

8. The device of claim 1, wherein the fully open position comprises an angle of approximately 180 degrees.

9. The device of claim 8, wherein the closed position comprises an angle of approximately 0 degrees.

10. The device of claim 1, wherein the first housing comprises a base housing and wherein the second housing comprises a display housing that comprises a display.

11. The device of claim 10, wherein the base housing comprises a processor and memory accessible to the processor and wherein the processor is operatively coupled to the display.

12. The device of claim 10, wherein the predefined open position comprises an open angle less than a viewing angle of the display of the display housing.

13. The device of claim 12, wherein the viewing angle of the display comprises an open angle greater than approximately 30 degrees.

14. The device of claim 10, wherein at an open position of the display housing with respect to the base housing that is greater than the predefined open position, friction force of the pivots exceeds gravitational force to maintain the open position.

15. The device of claim 14, wherein the gravitational force corresponds to a horizontal position of the base housing wherein the acceleration of gravity is normal to the base housing.

16. The device of claim 1, wherein between the closed position and the fully open position, the pivots operate individually over separate positional ranges.

17. The device of claim 16, wherein the pivot of the first housing operates over a first positional range from the closed position to the predefined open position and wherein the pivot of the second housing operates over a second positional range from the predefined open position to the fully open position.

18. A method comprising:
in a computing device that comprises a base housing that comprises a base housing pivot and a hinge recess that comprises a stop surface, a display housing that comprises a display housing pivot and a hinge recess, and a hinge link, that comprises a first portion coupled to the pivot of the base housing, a second portion coupled to the pivot of the display housing, and a concave portion disposed between the first portion and the second portion, wherein the concave portion comprises a stop that contacts the stop surface, locking the hinge link via a uni-directional bearing, coupled to the base housing pivot that rotates only in an opening direction of the display housing with respect to the base housing, in a locked position at a predefined open position of the display housing with respect to the base housing, wherein, in the locked position of the hinge link, the display housing is pivotable with respect to the base housing via the display housing pivot.

19. The method of claim 18, wherein the hinge link is rotatable in a closing direction of the display housing with respect to the base housing via frictional movement about the base housing pivot.

* * * * *